(No Model.)
L. B. GAYLOR.
SPROCKET MECHANISM FOR BICYCLES.
No. 581,024. Patented Apr. 20, 1897.
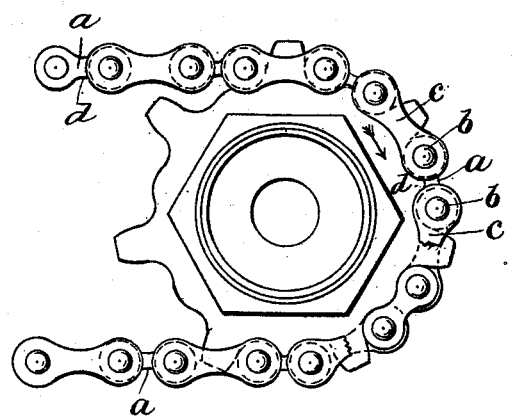
WITNESSES:
INVENTOR
Leonard B Gaylor.
BY Phillips Abbott ATTY'

UNITED STATES PATENT OFFICE.

LEONARD B. GAYLOR, OF ERIE, PENNSYLVANIA.

SPROCKET MECHANISM FOR BICYCLES.

SPECIFICATION forming part of Letters Patent No. 581,024, dated April 20, 1897.

Application filed January 3, 1896. Serial No. 574,201. (No model.)

*To all whom it may concern:*

Be it known that I, LEONARD B. GAYLOR, a citizen of the United States, and a resident of Erie, in the county of Erie and State of Pennsylvania, have invented a certain new and useful Improvement in Sprocket Mechanism for Bicycles, of which the following is a specification.

This invention relates to improvements in the construction of sprocket mechanism for bicycles.

The invention has for its object to so construct the engaging surfaces of the sprocket-wheel and the sprocket-chain that there will be no tendency on the part of the chain to crawl upwardly upon the teeth, but, on the contrary, that such relation will be established between the engaging surfaces of the chain and of the teeth as that the pull of the chain will be in direct radial lines relative to the sides of the teeth and their point of juncture with the sprocket-wheel, so that there will be no tendency on the part of the links, when under strain, to change their position relative to the teeth of the wheel, and the blocks of the chain are so constructed that they engage throughout with the sides of the teeth of the sprocket and also rest upon and are supported by the spaces between the teeth.

The drawing illustrates an elevation of the invention, showing the special construction of the sprocket-wheel and teeth and the parts of the chain, showing their relation one to the other.

The chain is made up of blocks *a*, having pivot-points *b* at each end, to which are attached the links *c*. The blocks fill the spaces between the teeth of the sprocket, and the links pass outside of the teeth, connecting one block with the other, and in order to make the blocks as light as possible without reducing their strength they are scalloped at their central portion, as shown at *b*, leaving, however, sufficient material at the narrowest part to afford the requisite strength. The links and the blocks are pinned together by cross pins or pivots.

Looking at the upper portion of the figure it will be noted that the front end of one of the blocks has just made contact with its bearing-surface on the sprocket, and as the sprocket is moved in the direction of the arrow there will be a pivotal movement of the block upon the bearing-surface with which it engages, and at the same time there is a similar movement of the block which is then leaving the sprocket. In order that this movement may be as free as possible, the ends of the blocks are rounded on a circle having the center of its pivot-point as the center, and the sprocket-wheel is made to conform to the shape of the blocks of the chain—that is to say, in forming the teeth of the sprocket the clearance curve is struck from the pivot center at the opposite side of the tooth, and it connects with the curve of the bearing portion at a point on a line drawn between the two opposite pivot centers, and the bearing-surfaces on the side of each tooth and on the face of the sprocket between the teeth are such as to exactly coincide with the rounded contour of the ends and of the scalloped side of the block which engages therewith. Thus the blocks are supported throughout by the sprocket, and the line of strain of any block upon any tooth will be radial to the curve of the bearing-surface of the tooth, and consequently there is no tendency of the block to move in or out upon the tooth, the line of strain being always at right angles to the curve of the teeth. A tooth so formed will allow sufficient clearance for the chain in moving on and off from the sprocket, and attention is called to the bottom of the figure, where a block is seen just at the point of leaving contact with a tooth.

It will be noted that the movement of the block in leaving the sprocket is a pivotal one from the same center as the center of the curve of the tooth, so that the movement of the block and the curve of the tooth coincide at all points, and the block readily clears the tooth without binding. A similar movement takes place as the chain makes contact with the sprocket, as hereinbefore stated.

As sprocket wheels and chains of this class have heretofore been made the teeth have been so shaped that the peculiar benefits arising from the special coactive relationship of the rounded ends and the curved sides of the blocks, which take a bearing upon and maintain their position on corresponding bearing-surfaces upon the sprocket, have not been appreciated nor availed of. The universal custom of all makers of bicycles and the like prior to the introduction of this improvement has been to make the teeth of the sprocket mere radial projections adapted to enter the spaces between the side links of the sprocket-chain and to impinge against the ends of the blocks, and thus affect the desired movement entirely regardless of any relation between the engaging surfaces of the blocks and the sprocket. Consequently all prior bicycle-sprocket mechanism has been open to serious objections which are obviated by my construction—that is to say, the wear upon the teeth and upon the blocks has been confined to relatively small areas, tending to gouge out the sides of the teeth and to misshape the ends of the blocks; also, the strain has had a tendency to cause the blocks to crawl up upon the teeth, thus throwing the chain out of registration with succeeding teeth, generating friction, wear on the parts, and lost motion, and the free movement of the blocks upon the chain is arrested in moving on and off the sprocket. These faults in time produce a loose condition of the chain, and after comparatively little use a shackling condition of the machine ensues. This objection is especially objectionable in "tandems," where exact coincidence in movement between the dual mechanisms and the other coactive parts is exceedingly desirable.

I claim—

The combination with a sprocket-chain having blocks with link connections at each end and a reduced middle portion, of a sprocket-wheel made of a single solid piece, the bearing-surfaces of which at the sides of the teeth, and also between the teeth coincide throughout with the corresponding surfaces of the blocks, for the purposes set forth.

Signed at Erie, in the county of Erie and State of Pennsylvania, this 28th day of December, A. D. 1895.

LEONARD B. GAYLOR.

Witnesses:
GEORGE E. GIBSON,
CLARK OLDS.